United States Patent
Shaffer et al.

(10) Patent No.: US 9,860,380 B2
(45) Date of Patent: Jan. 2, 2018

(54) AGENT RATING PREDICTION AND ROUTING

(71) Applicant: Avaya Inc., Basking Ridge, NJ (US)

(72) Inventors: Shmuel Shaffer, Palo Alto, CA (US); Patrick Tendick, Basking Ridge, NJ (US); Sheldon Davis, Guelph (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/173,610

(22) Filed: Feb. 5, 2014

(65) Prior Publication Data

US 2015/0215463 A1 Jul. 30, 2015

Related U.S. Application Data

(60) Provisional application No. 61/933,191, filed on Jan. 29, 2014.

(51) Int. Cl.
*H04M 3/51* (2006.01)
*H04M 3/523* (2006.01)

(52) U.S. Cl.
CPC ........ *H04M 3/5232* (2013.01); *H04M 3/5238* (2013.01); *H04M 2203/401* (2013.01)

(58) Field of Classification Search
CPC ...... H04M 3/5175; H04M 3/523; H04M 3/51; H04M 3/5183; H04M 3/5191; H04M 3/5233; H04M 3/5232; H04M 3/5158; H04M 3/5238; H04M 3/5235; H04M 3/5166
USPC .. 379/265.01–265.02, 265.1, 265.12–265.13
See application file for complete search history.

(56) References Cited

U.S. PATENT DOCUMENTS

| | | | |
|---|---|---|---|
| 6,173,053 B1 | 1/2001 | Bogart | |
| 7,158,628 B2 * | 1/2007 | McConnell et al. | 379/265.02 |
| 8,037,080 B2 | 10/2011 | Koren | |
| 8,300,798 B1 * | 10/2012 | Wu | H04M 3/5233 379/265.11 |
| 8,369,509 B2 | 2/2013 | Jennings | |
| 8,411,842 B1 | 4/2013 | Wu | |
| 8,458,121 B2 | 6/2013 | Kenedy et al. | |
| 8,781,105 B1 * | 7/2014 | Duva | H04M 3/51 379/201.01 |
| 2009/0180607 A1 * | 7/2009 | Kamlet | H04M 3/5233 379/265.12 |
| 2010/0142698 A1 | 6/2010 | Spottiswoode et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2012/0051537 A1 * | 3/2012 | Chishti et al. | 379/265.11 |
| 2012/0257518 A1 | 10/2012 | Erhart et al. | |
| 2012/0278136 A1 | 11/2012 | Flockhart et al. | |
| 2012/0300920 A1 | 11/2012 | Fagundes et al. | |

(Continued)

*Primary Examiner* — Rasha Al Aubaidi
(74) *Attorney, Agent, or Firm* — Sheridan Ross P.C.

(57) ABSTRACT

An agent rating prediction and routing mechanism provided by a contact center communication system for work assignment optimization is described along with various methods and mechanisms for administering the same. The prediction system proposed herein analyzes past agent performance, agent attributes, contact attributes, and customer attributes to calculate an outcome value and to provide a performance prediction for use in work item routing to contact center resources.

20 Claims, 6 Drawing Sheets

(56) References Cited

U.S. PATENT DOCUMENTS

| | | |
|---|---|---|
| 2013/0110481 A1 | 5/2013 | Sullivan et al. |
| 2013/0216036 A1 | 8/2013 | Chishti et al. |
| 2013/0251138 A1 | 9/2013 | Spottiswoode et al. |
| 2014/0119533 A1* | 5/2014 | Spottiswoode et al. .. 379/265.11 |
| 2014/0249873 A1* | 9/2014 | Stephan ........... G06Q 10/06375 705/7.11 |
| 2015/0036815 A1* | 2/2015 | Conway et al. ......... 379/265.12 |

* cited by examiner

AGENT RATING PREDICTION AND ROUTING

CROSS-REFERENCE TO RELATED APPLICATIONS

This application claims the benefit of U.S. Provisional Patent Application Ser. No. 61/933,191, Jan. 29, 2014, the entire disclosure of which is hereby incorporated herein by reference.

FIELD OF THE DISCLOSURE

The present disclosure is generally directed toward communications and more specifically toward contact centers.

BACKGROUND

Many large contact centers use an analytics-based quality management system like Avaya Aura® Workforce Optimization (WFO). WFO applications for recording, monitoring, and soliciting feedback are typically used to rate contact center agents based on a random sample of calls the agents handle. One or more supervisors and/or quality managers may listen to a recording of a sampled call and/or review text and then rate the agent's handling of the call according to predetermined criteria. However, the information is currently not used directly to route contacts to the best agent because these ratings are only outcomes and are not known until after the contact has been completed. Clearly, using information about agent ratings and other outcomes to route contacts has great potential to improve customer experience and other business outcomes (e.g., reduced cost, increased revenue, etc.). Other outcomes include whether the agent resolved the customer's issue, handling time, holds, business outcomes like revenue, etc.

Avaya Aura® Experience Manager contains a context store, a repository for attributes of contacts that are captured in the course of a contact, often in an Interactive Voice Response (IVR) application or other self-service application. Examples of attributes include the type of transaction requested and demographic information about the customer. Most of the attributes are known before the contact is routed to an agent. Additionally, existing quality management implementations do not typically collect ratings in a way that measures all of the true capabilities of agents. Specifically, randomly selecting calls to be rated from among those routed to agents by an existing routing mechanism can introduce substantial bias into the sample, because the sampled contacts are not representative of the contacts an agent could possibly handle. This bias prevents the contact center from learning how well an agent could do on the various types of calls they could receive. This may lead to poor routing decisions and loss of productivity if routing decisions are made based on biased results.

SUMMARY

These and other needs are addressed by the various aspects, embodiments, and/or configurations of the present disclosure. The present disclosure is directed to a mechanism for agent rating prediction and routing. Based on attributes of a contact, attributes of an agent, ratings, and other contact outcomes of agents on previous contacts, the system is operable to provide ratings and outcome predictions that can be used to route a contact to a best agent. More specifically, the mechanism for agent rating prediction and routing employs predictive models that seek to maximize the accuracy of the predictions. The predictions may be used by a work assignment system to meet routing goals.

Contact centers have devised many strategies to monitor agent performance and to find an agent who has the greatest likelihood of success for a particular contact. A work assignment engine, like that provided by Avaya Aura® Experience Manager, can maintain attributes of agents in a context store, and can match those attributes to attributes of a contact to find agents who are qualified to handle that contact. For example, agent attributes like language proficiency and product knowledge can be used to decide if an agent is qualified. Furthermore, reporting systems and workforce management systems can provide detailed information about the outcome of a contact. For example, a WFO application may provide ratings of contacts according to certain criteria. Additional attributes of a contact may be available, including demographic information and purchase history for the caller. The contact center would be best served to use all available information to find an agent who will provide the best possible outcome for a contact.

Attributes of past contacts and of the agents who handled those contacts, as well as outcomes of those contacts, may be used to generate a predictive model that can predict the outcomes of future contacts for qualified agents. The predictive model is generated in such a way as to make optimal use of the available information, that is, maximizing the accuracy of the predictions. The predicted outcomes can then be used by a work assignment engine to make the best contact-agent assignments, either by assigning an available agent to a new contact, or by assigning a waiting contact to a newly available agent.

The mechanism for agent rating prediction and routing may divide the contacts into categories, each category having a separate model. For example, the categories may comprise Sales, Support, and Billing. Each category may behave in a fundamentally different way from other categories and may require a different model. For a given category, the model is broken into a portion that applies to all contacts, with separate models for each agent. The agent models have similar general form, including variables used, regularization, and/or historic information, but the agent models can have different parameters. The category and the agent models can take a variety of forms, including linear and nonlinear regression, tree regression, logistic regression, generalized linear models, generalized additive models, Bayesian models, nearest neighbor regression, smoothing splines, and kernel method smoothers. The category and the agent models can be combined using several possible mechanisms, including addition, multiplication, or some further parameterization or specification of the agent model.

In a non-limiting example, a model for the Support category might comprise a high-level model capable of predicting performance based solely on the product associated with the call in concert with a model for each agent capable of predicting how well a specific agent will do. The agent model may highlight the inherent ability and/or skill level of the agent. The agent model may reflect the length of time the agent has been on the job and provide weighted allowances for learning curves for individual agents. The predicted performance for a specific agent may be obtained by multiplying the prediction of the category model by the prediction of the agent model for that agent.

In an additional embodiment when the agent decides to transfer the call, the work assignment engine may route the call to the next best available agent or run the rating prediction again to recommend another agent (changed availability). The new recommendation and routing would be based on all of the attributes collected to that point, including attributes collected and inputted by a first agent after answering the call.

These and other advantages will be apparent from the disclosure.

In some embodiments, a method is provided that generally comprises:

receiving a work item in a contact center, the work item being associated with a first customer and corresponding to a contact in the contact center to be processed by a contact center agent;

predicting a first agent's ability to process the work item, wherein the first agent's ability to process the work item is predicted with a prediction model specifically created based on one or more attributes of the work item;

predicting a second agent's ability to process the work item, wherein the second agent's ability to process the work item is predicted with the prediction model specifically created based on the one or more attributes of the work item;

comparing the prediction for the first agent with the prediction for the second agent; and based on the comparison of predictions, assigning the work item to one of the first and second agents and inversely, a method is provided that generally comprises:

receiving a plurality of work items in a contact center, the plurality of work items corresponding to one or more contacts in the contact center to be processed by a contact center agent;

determining an attribute combination for each of the plurality of work items, wherein the attribute combination for each of the plurality of work items comprises one or more attributes associated with contact processing requirements of each of the plurality of work items;

predicting the agent's ability to process a first work item in the plurality of work items, wherein the agent's ability to process the first work item is predicted with a prediction model specifically created based on one or more attributes of the agent and the one or more attributes of the first work item;

predicting the agent's ability to process a second work item in the plurality of work items, wherein the agent's ability to process the second work item is predicted with a prediction model specifically created based on one or more attributes of the agent and the one or more attributes of the second work item;

comparing the prediction for the first work item with the prediction for the second work item; and based on the comparison of the predictions, assigning the agent to the selected one of the first and second work items.

The term "automatic" and variations thereof, as used herein, refers to any process or operation done without material human input when the process or operation is performed. However, a process or operation can be automatic, even though performance of the process or operation uses material or immaterial human input, if input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "customer" or "client" denotes a party patronizing, serviced by, or otherwise doing business with a contact center, business, or enterprise.

The phrase "work force optimization" as used herein is a method that uses analytics to tie all aspects of staffing to business goals, such as customer experience, profit, operational efficiency, and growth.

The phrase "context store" as used herein is a software application operable to store, retrieve, and display contact data, in particular but not limited to, contact attributes.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
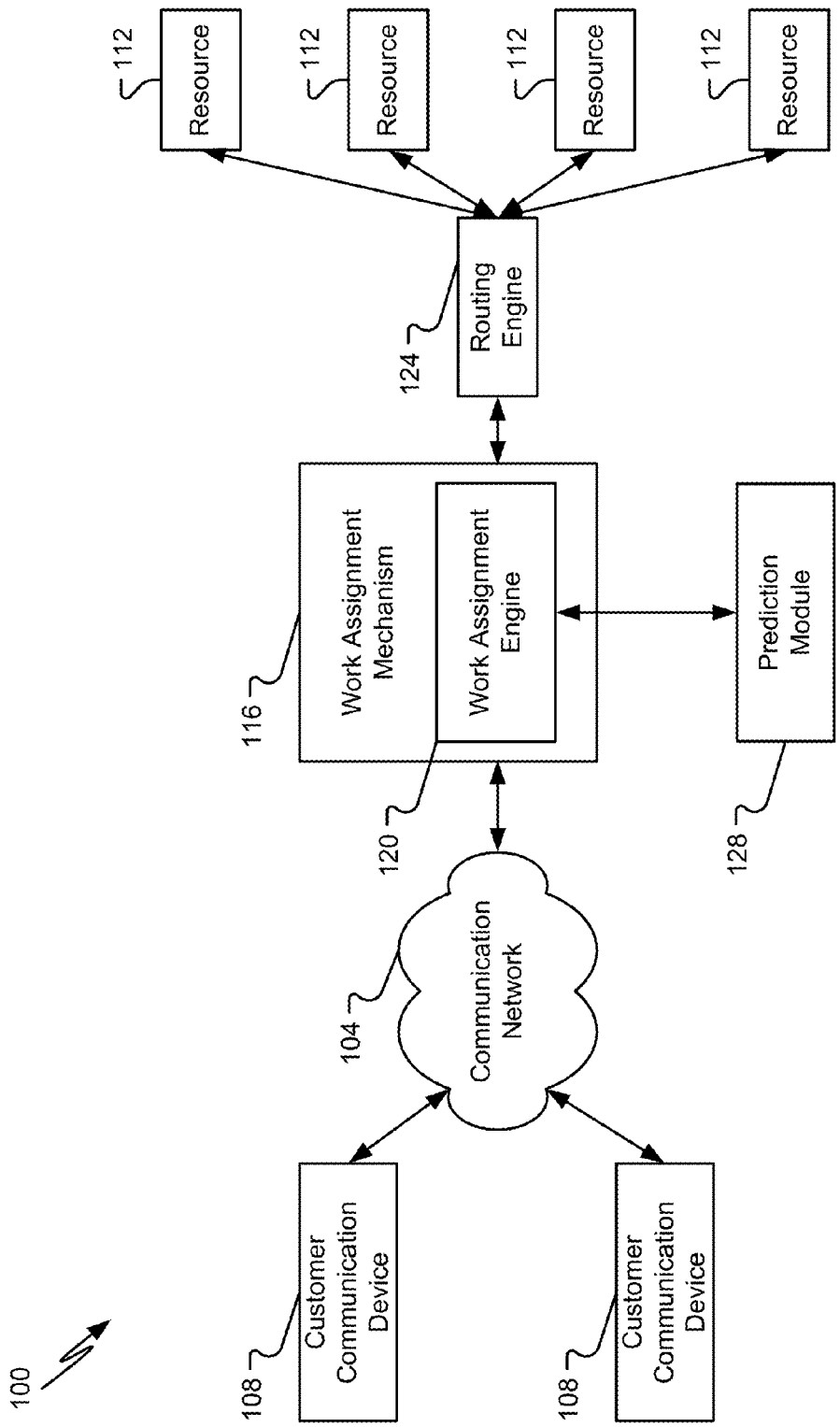
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle incoming work items from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, each of which are hereby incorporated herein by reference in their entirety.

The work assignment mechanism 116 may employ any queue-based or queueless work assignment algorithm. Examples of queue-based work assignment skill-based algorithms include, without limitation, a fairness algorithm, pacing algorithm (which inserts rests into the agents work queue), value-based algorithms, limited algorithms (such as Business Advocate™ by Avaya, Inc.), and outsourcing algorithms. Other algorithms may consider other types of data inputs and/or may treat certain data inputs differently.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, cellular phone, smartphone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item can be sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112*a-n* connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 may be configured to administer and make work assignment decisions in a queueless contact center, as is described in U.S. Patent Publication No. 2011/0255683, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (i.e., determine optimal assignment of a work item resource to a resource). In some embodiments, the work assignment engine 120 can be configured to achieve true one-to-one matching by utilizing bitmaps/tables and other data structures.

In accordance with at least some embodiments of the present disclosure, a prediction module 128 may comprise software operable to collect, analyze, and provide information, including attributes of a new contact, attributes of an agent, and ratings and other contact outcomes of agents on previous contacts. Additionally, the prediction module 128 provides predictive modeling that seeks to maximize accuracy of the predictions. Information provided by the prediction module 128 can be used by the work assignment engine 120 to route work items.

More specifically, the prediction module 128 is operable to divide contacts into categories, each containing a separate model. Each model may behave in a fundamentally different way that requires a particular and/or different model. For any given category, a model may be broken into a portion that applies to all contacts and separate models for each agent 112. Agent models may be identical in form, variables, regularization, and prior information, but may contain a range of different parameters. The category models and the agent models may take a variety of forms, including linear and non-linear regression, tree regression, logistic regression, generalized linear models, generalized additive models, Bayesian models, nearest neighbor regression, smoothing splines, kernel method smoothers, and the like. The category models and the agent models may be combined using addition, multiplication, parameterization, specification of the model, and the like.

Figure 2:
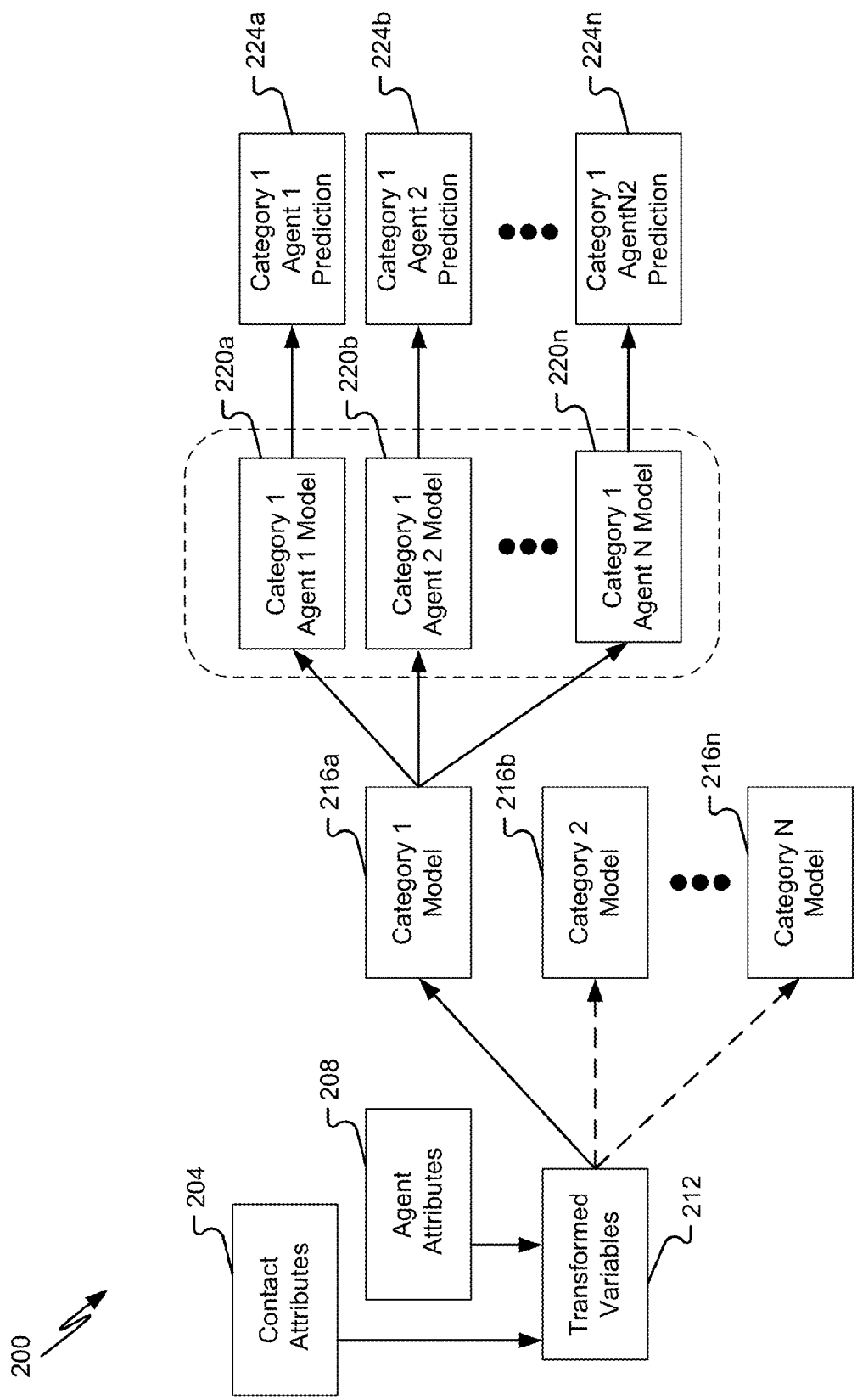
FIG. 2 is a block diagram for a mechanism for agent rating prediction and routing in accordance with embodiments of the present disclosure.

FIG. 2 is a block diagram example of a mechanism for agent rating prediction and routing 200. One goal is to predict future performance of an agent during an interaction with a particular contact. A prediction model may be invoked that takes into account attributes of the agent, a customer, and specific attributes of the contact apart from those of the customer (e.g., why the customer initiated the contact). The prediction model may work by analyzing past performance of agents with contacts. More specifically, the prediction model may calculate an estimated expected value of an outcome (Y) given attributes of the agent, the customer, and the contact (X), or $E(Y|X)$. Choosing agents and callers that maximize the expected outcome can maximize a total outcome across all contacts, including a maximization of expected revenue and other business goals.

Outcome variables, also known as dependent variables, can measure contact outcomes, including agent ratings, handling time, revenue, and whether or not problem was resolved. Predictor variables, also known as independent variables, can be variables used to predict outcome variables, which can be associated with the contact, the customer, the agent, or the context (e.g., time of day). Qualitative or categorical variables (e.g., gender) can be re-coded as 0-1 variables. Model families may be groups of similar models that differ only in the variables included. Model fitting may be a mechanism used to fit models to predict contact outcome variables, including selecting variables and estimating parameters. Model fitting may require selecting which model family to use.

Contacts may be assigned to categories 216*a-n* (e.g., Sales, Support, Billing, etc.) and then may use different model families, model selection, regularization, and estimation for each category 216. The categories 216*a-n* may be determined from the contact attributes 204. Different categories 216*a-n* may have different outcome variables, and for a given category 216*a-n*, each outcome variable can have a different model family, model selection, regularization, and estimation. Some relationships between outcomes and predictors may depend on attributes of a particular agent 112, while others may only depend on the category 216*a-n*. For a given category, agent attribute models 208 can have the same model family and regularization. However, the parameters may be calculated separately for each agent attribute model 208. For example, each agent attribute model 208 could include a log linear model with the same variable, but with estimates different from other agent attribute models 208. The predictive models can be placed into a single category model 216 with a different model for each agent 220*a-n*. The category/agent models 220*a-n* can then be analyzed and delivered as category/agent predictions 224*a-n*.

Predictors can be obtained by estimating unknown parameters of a model and then using the estimated unknown parameters in the model. Using variable selection and regularization, information may be added to the model to avoid over-fitting and to get reasonable parameter estimates. The variable selection and regularization may restrict the model to include only a particular subset of variables, restrict the number of variables allowed in the model, and/or impose a penalty on the magnitude of the parameters in the model. The predictor may be defined based on latent variables or other transformed variables 212 that do a better job of representing the variation in the attributes than the attributes themselves. Category/agent predictions 224a-n can be sent to the work assignment engine 120 to assist with routing decisions.

Non-limiting representation of predictor variables, outcome variables, and model families can be used, where:
$X_{ij}$=Variable j of call i (predictor variable)
$Y_i$=Outcome of call i (outcome variable)
$X_i$=Vector of attributes of call i=$(X_{i1}, \ldots, X_{ik})$ In a non-limiting example, if the prediction model were a linear model, then the predicted outcome might look like this:

$$g(X_i)=E(Y_i|X_i)=\alpha+\beta_1 X_{i1}+\beta_2 X_{i2}+\beta_1 X_{i3}$$

In another non-limiting example, if the prediction model were a log linear model, then the predicted outcome might look like this:

$$g(X_i)=e^{\alpha+\beta_1 X_{i1}+\beta_2 X_{i2}+\beta_1 X_{i3}}$$

In another non-limiting example, if the prediction model were a logistic model, then the predicted outcome might look like this:

$$g(X_i) = \frac{e^{\alpha+\beta_1 X_{i1}+\beta_2 X_{i2}+\beta_1 X_{i3}}}{e^{\alpha+\beta_1 X_{i1}+\beta_2 X_{i2}+\beta_1 X_{i3}} + 1}$$

In a non-limiting example, assume the categories of calls are Sales, Support, and Billing, and the outcome variable is handling time in seconds (Y). Assume also that the predictor variables are agent time on the job in weeks ($X_1$), caller's age ($X_2$), caller's income ($X_3$), and product. Product is a category, so it may be coded as
$X_4$=1 if product is smartphone, 0 otherwise
$X_5$=1 if product is tablet, 0 otherwise
$X_6$=1 if product is mp3 player, 0 otherwise The model family chosen may be log linear, and the variables selected for the Support category model may be $X_4$, $X_5$, and $X_6$, representing the product. The category segment model can be:

$$\hat{Y}=e^{7.15X_4+6.67X_5+6.19X_6}$$

The variable selected for the agent models is $X_1$, and the agent model for agent k can be:

$$\hat{Y}_{ak}=e^{a_k+b_k X_1}$$

For agent 3, $a_3$=−0.063 and $b_3$=−0.093, and there is a tablet call with $X_1$=7. The category/agent prediction 224 for handling time for agent 3 is:

$$\hat{Y}_3=e^{7.15 \cdot 0+6.67 \cdot 1+6.19 \cdot 0} \cdot e^{-0.063-0.093 \cdot 7}=386 \text{ seconds}=6 \text{ minutes, 26 seconds.}$$

Figure 3:
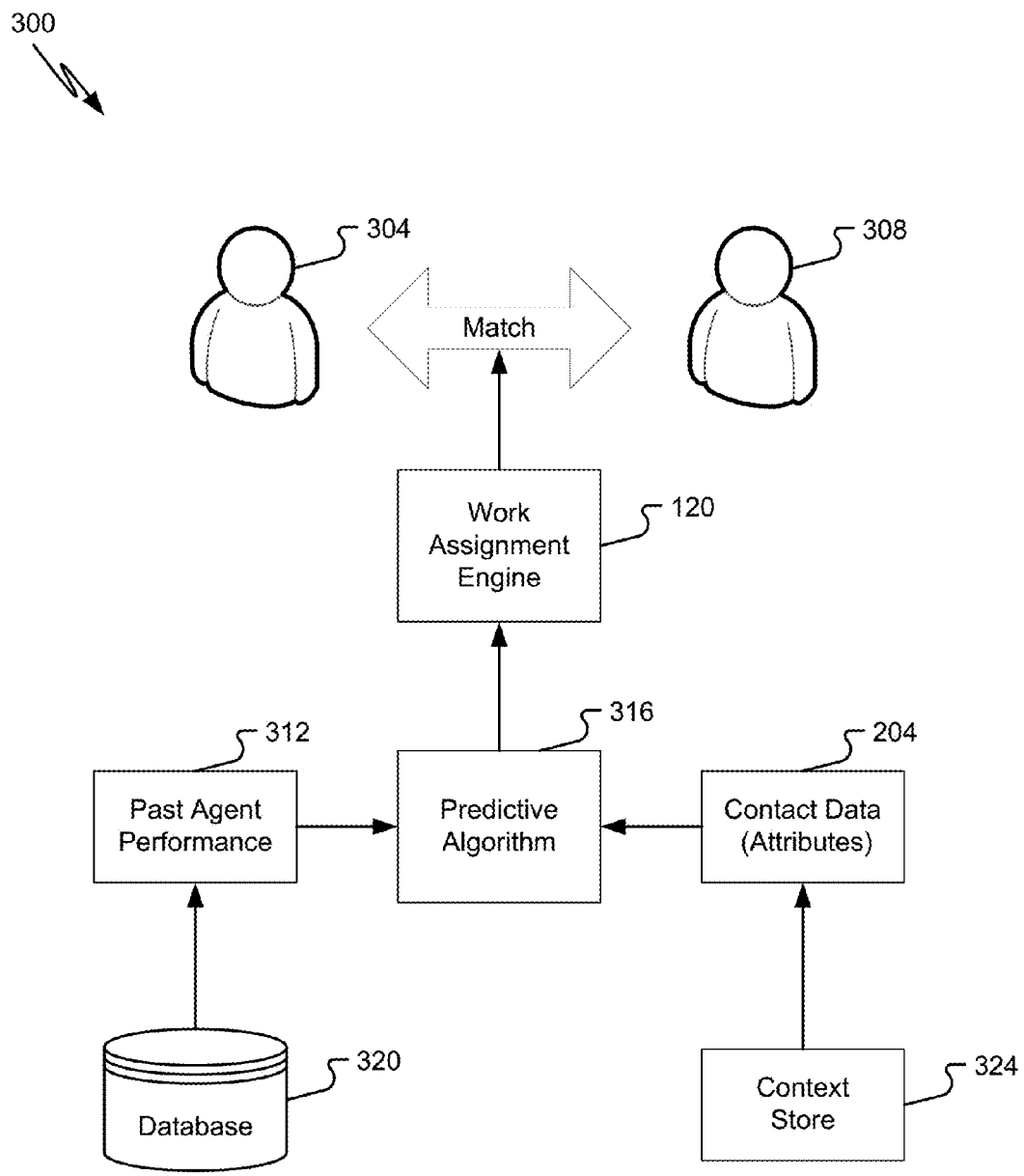
FIG. 3 is a block diagram for agent assignment in accordance with embodiments of the present disclosure.

With reference now to FIG. 3, aspects of agent assignment 300 in accordance with embodiments of the present disclosure are provided. FIG. 3 highlights the role of the prediction model in the agent assignment process. The prediction model does not decide which agent should handle a call. The prediction model may provide predictions for use by a work assignment engine 120 running contact center algorithms.

Decisions based on actual data are inherently better than those made without data. However, having a prediction model that can predict the expected outcome for a given agent may not be enough. The predictions 224 are approximate, due to random variations in the data that may make the past performance 312 of an agent 304 appear better or worse than actual performance of the agent 304. As more data is collected on the performance of an agent 304, the predictions 224 of that agent's performance will become more accurate. Because the work assignment engine 120 may match work items with an agent 304 from a pool of many agents 304, the work assignment engine 120 could potentially choose an agent that only appears to be better because the agent's prediction is inaccurate. In other words, instead of choosing the best agent 304, the work assignment engine 120 could choose an agent 304 with high uncertainty, having the opposite effect of what a company would want. The solution is to have a prediction module 128 that contains an uncertainty model that may adjust each prediction to account for uncertainty in the prediction.

In a non-limiting example, a contact center may handle calls with the following contact attributes 320 that may be stored in a context store 324:
Language—The selected spoken language of the caller.
Product—The product that is the reason for the call.
Transaction Type—The type of transaction requested (sales or support).
Gender.
Geographical Region—NA (North America), CALA (Caribbean and Latin America), EMEA (Europe, the Middle East, and Africa), or APAC (Asia Pacific).
Country.
State/Province.
Age Group.
New Customer—Whether the caller is a new customer.
Purchase Location—In store, on line, or phone.
Carrier—Wireless carrier, if any.

| Agent | Language | Product | Transaction Type |
|---|---|---|---|
| Bob | English | phone, tablet, mp3 | Support |
| Sue | English | phone, mp3 | Sales, Support |
| Andres | Spanish, French | phone, tablet, mp3 | Sales, Support |
| Maria | English, Spanish | tablet | Sales, Support |
| Walter | English, Spanish, French | phone, tablet | Support |

The contact center may have five agents 304: Bob, Sue, Andres, Maria, and Walter. Agents 304 have agent attributes 208 that identify the types of contacts based on contact attributes 204 that the agents 304 are qualified to handle. In this example, the prediction module 128 samples the first ten contacts for the purpose of obtaining ratings of the agents 304, builds a predictive model for the ratings based on the contact attributes 204, and may provide predictions 224 for the next five contacts.

| Contact | Language | Product | Transaction Type | Gender | Geographical Region | Country | State/Province | Age Group | New Customer | Purchase Location | Carrier |
|---|---|---|---|---|---|---|---|---|---|---|---|
| 1 | English | phone | Sales | M | NA | USA | NJ | 51-60 | Yes | Phone | Verizon |
| 2 | Spanish | tablet | Support | F | NA | USA | TX | 22-25 | No | In store | AT&T |

-continued

| Contact | Language | Product | Transaction Type | Gender | Geographical Region | Country | State/Province | Age Group | New Customer | Purchase Location | Carrier |
|---|---|---|---|---|---|---|---|---|---|---|---|
| 3 | English | phone | Support | F | EMEA | UK |  | 31-40 | No | On line | T-Mobile |
| 4 | Spanish | tablet | Support | M | EMEA | Spain |  | 18-21 | No | On line | Orange |
| 5 | French | tablet | Sales | F | NA | Canada | QC | 41-50 | Yes | Phone | Virgin |
| 6 | English | mp3 | Support | M | EMEA | UK |  | 61+ | No | In store | None |
| 7 | English | phone | Support | M | NA | USA | NY | 31-40 | No | In store | Verizon |
| 8 | English | phone | Support | F | NA | USA | CA | 22-25 | No | On line | AT&T |
| 9 | English | tablet | Sales | M | NA | USA | NC | 26-30 | No | Phone | None |
| 10 | Spanish | phone | Support | M | CALA | Colombia |  | 18-21 | No | In store | Movistar |
| 11 | English | tablet | Support | M | EMEA | UK |  | 26-30 | No | In store | Orange |
| 12 | Spanish | phone | Support | F | NA | USA | PR | 51-60 | No | On line | T-Mobile |
| 13 | English | phone | Support | F | NA | USA | IL | 51-60 | No | In store | Verizon |
| 14 | English | mp3 | Support | M | NA | Canada | ON | 41-50 | No | On line | None |
| 15 | Spanish | tablet | Sales | F | CALA | Mexico | DF | 22-25 | Yes | Phone | None |

In the example, the first ten contacts may be sampled for rating by the prediction module 128. In practice, the contacts sampled can be spread over an extended time period and can constitute a small subset of calls in any given time period. Also, the example covers the agent surplus case, that is, when there are more agents 304 available than calls to be handled. However, a very similar process would happen in the call surplus case, where there are more calls than there are agents 304 to handle them.

Note that the agents 304 may possess only a subset of the contact attributes 204, but an agent 304 can have several values of a given agent attribute 208. For example, agent Walter 304 can speak three languages. The predictive algorithm 316 within the prediction module 128 first looks at the attributes of contact number five 308, then looks at the agents' attributes 208 and the agents' past performance 312 to identify the agents 304 who are qualified to handle the contact. The information may be provided to the work assignment engine 120 which may select Walter 304 based on predicted proficiency to help a contact 308 if the prediction number aligns with other goals, rankings, and/or thresholds commonly used in contact centers. For example, the work assignment engine 120 might have a goal to keep agent occupancy below a certain threshold, which could prevent it from assigning a contact to the available agent 304 with the highest predicted rating.

| Contact | Agent | Ratings | | | | |
|---|---|---|---|---|---|---|
| | | Courtesy | Script Adherence | Business Results | Language Comprehension | Overall |
| 1 | Bob | 3 | 3 | 5 | 4 | 3.50 |
| 2 | Walter | 4 | 3 | 5 | 4 | 4.00 |
| 3 | Sue | 5 | 3 | 4 | 5 | 4.25 |
| 4 | Maria | 3 | 5 | 2 | 5 | 3.75 |
| 5 | Andres | 4 | 3 | 5 | 3 | 3.75 |
| 6 | Bob | 3 | 2 | 2 | 2 | 2.25 |
| 7 | Walter | 4 | 3 | 4 | 4 | 3.75 |
| 8 | Sue | 4 | 3 | 3 | 5 | 3.75 |
| 9 | Maria | 3 | 4 | 3 | 4 | 3.50 |
| 10 | Andres | 4 | 3 | 2 | 4 | 3.25 |

Additionally, the prediction module 128 may rate the agents 304 for the first ten contacts. The ratings may consist of specific ratings (e.g., Courtesy, Script Adherence, Business Results, Language Comprehension), measured on a scale of 1 to 5. The agent ratings may be stored in a database 320. Additionally, there may be an overall rating that is the simple average of the specific ratings. In this example, the work assignment engine 120 uses the overall rating to decide which agent 304 to select from among the qualified agents 304 to help the caller 308. Depending on business priorities, the overall rating can be computed as a weighted average of the specific ratings, where the weights are possibly unequal, or the overall rating can be computed from the specific ratings in some other way, or the work assignment engine 120 can use the specific ratings in determining how best to meet routing and other business goals.

Figure 4:
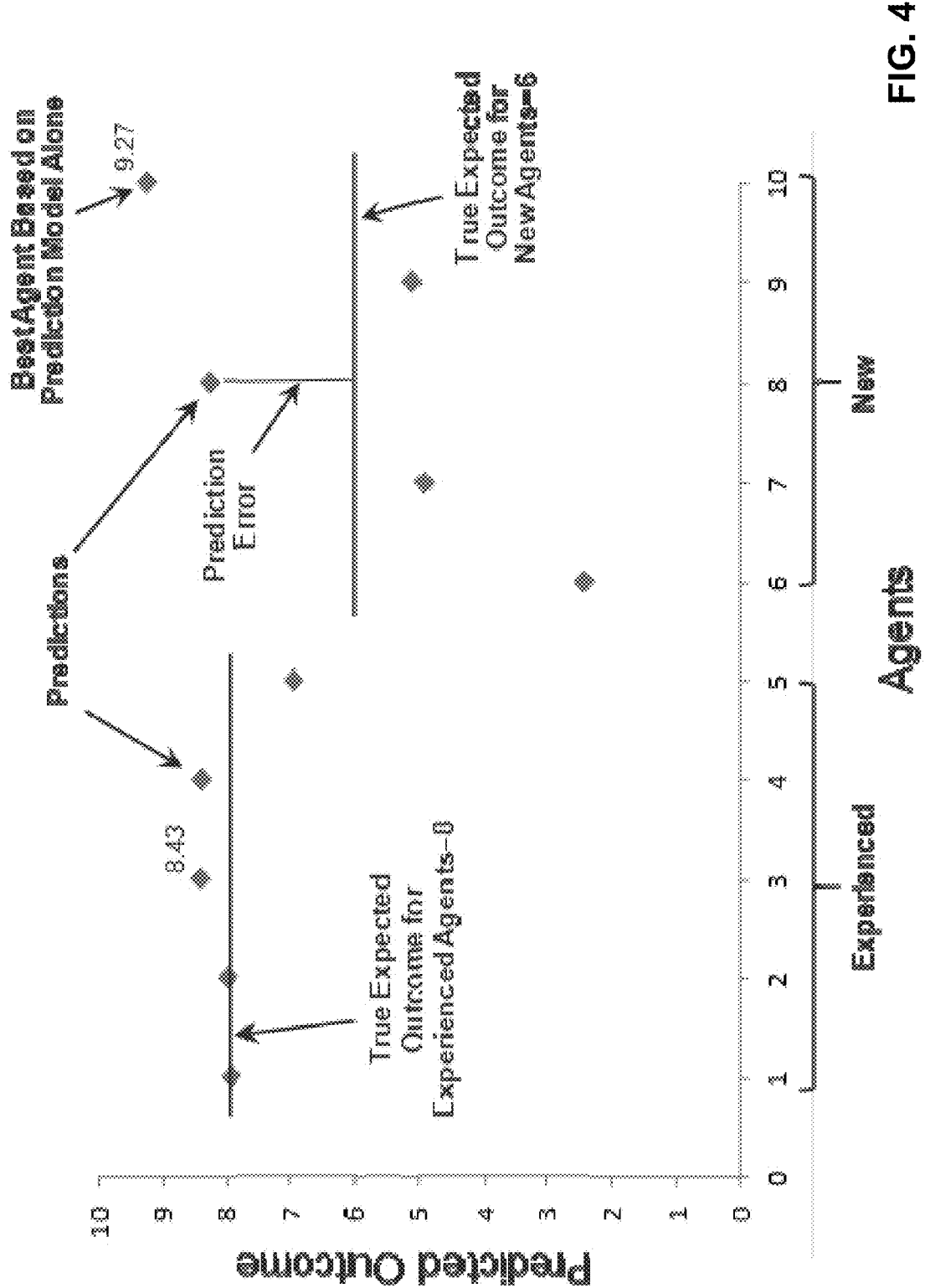
FIG. 4 is a graph highlighting predicted outcomes in accordance with embodiments of the present disclosure.

FIG. 4 is a graph highlighting predicted outcomes in accordance with embodiments of the present disclosure. When true outcomes are measured and a basic model uses prediction error to determine agent assignment, the system may introduce bias due to uncertainty.

In a non-limiting example, a contact center may have ten agents 304 available to take calls. Agent 1, agent 2, agent 3, agent 4, and agent 5 are experienced agents 304, and agent 6, agent 7, agent 8, agent 9, and agent 10 may be new and/or inexperienced agents 304. A new contact 308 may come into the contact center via a call from a customer communication device 108, and a prediction module 128 may calculate the predicted outcome for each agent 304. Because there is less data on the new agents 304 (agents 6-10), the predicted outcomes for the inexperienced agents 304 are much less accurate. For example, on her first day on the job, agent 10 "landed a whale," a customer 308 who was ready to spend a lot no matter which agent 304 handled the call. A work item of this magnitude makes the predicted outcome of the new call for agent 10 larger.

Suppose the expected outcome for the experienced agents 304 is actually 8, and the expected outcome for the new agents 304 is actually 6. In other words, the experienced agents are really better suited to handle the contact 308. On average, the predicted outcomes for each group are close to accurate. If the predicted outcomes for the experienced agents have a standard deviation (standard error) of 0.5, and the predicted outcomes for the new agents have a standard error of 3.0, then we could see the predicted outcomes in FIG. 4. The prediction model tells us that agent 10 has the highest predicted outcome (9.27), whereas agent 3 has the highest predicted outcome for among experienced agents (8.43). Clearly, there is a bias. The bias may be introduced because the system may choose the maximum predicted outcome which favors predictions with higher variability.

Figure 5:
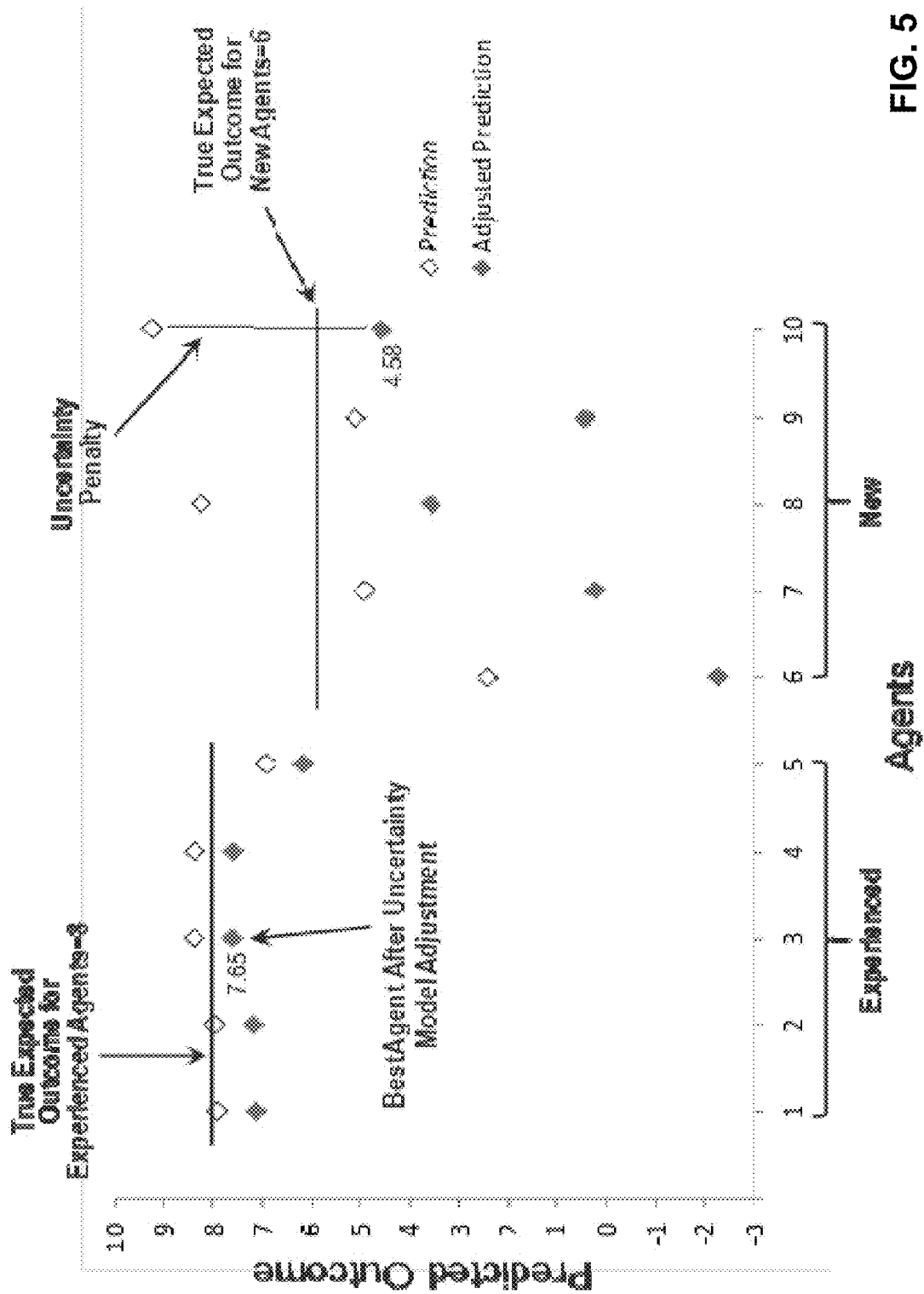
FIG. 5 is a graph highlighting adjusted prediction outcomes in accordance with embodiments of the present disclosure.

FIG. 5 is a graph highlighting adjusted prediction outcomes in accordance with embodiments of the present disclosure.

Based on the estimated prediction error produced by the prediction model, the number of agents 304 to choose from, and the predictor variables, the prediction module 128 may calculate a penalty for each prediction. The prediction module 128 may, for example, use an uncertainty model that assesses a penalty of 0.595 for each of the experienced agents 304 and 3.57 for each of the new agents 304. FIG. 5 shows that agent 3 has the highest adjusted predicted outcome (7.84), whereas the adjusted predicted outcome for Agent 10 is 5.70. The experienced agents 304 may be rated appropriately higher than the new agents 304. Furthermore, the maximum for experienced agents 304 may be close to the actual expected outcome for experienced agents 304, and likewise for new agents 304. In the example, the penalties for the agents 304 were obtained by multiplying 1.56 times the standard deviation of each predicted outcome. The factor 1.56 is the expected value of the maximum standard, normal random variables. Other factors and penalties may also be used to refine the rating. Based on the adjusted prediction, the work assignment engine 120 may make more appropriate and efficient matches of agents 304 with work items.

Figure 6:
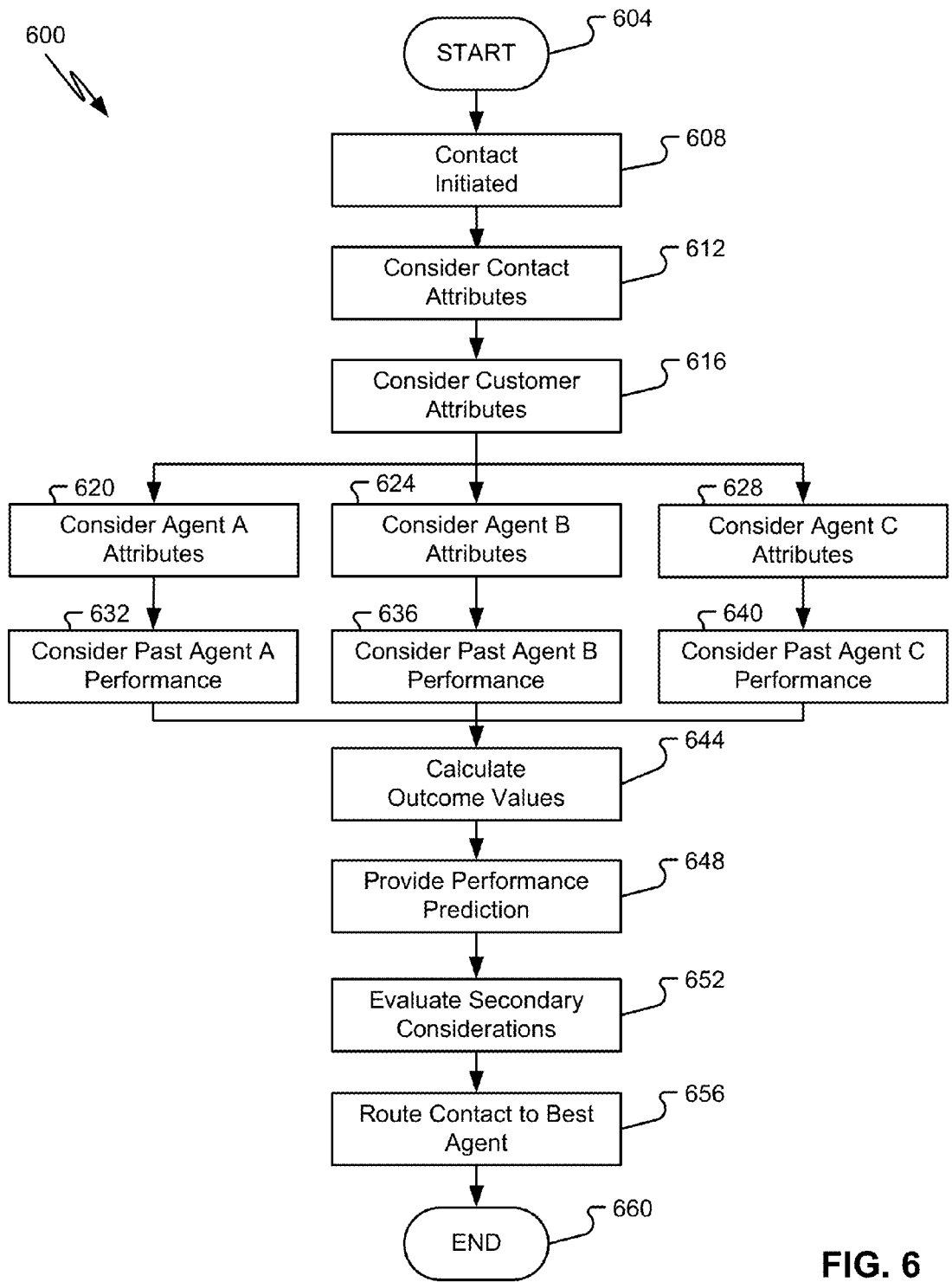
FIG. 6 is a flow diagram for agent rating prediction and routing in accordance with embodiments of the present disclosure.

With reference now to FIG. 6, aspects of a method 600 for agent rating prediction and routing in accordance with embodiments of the present disclosure are depicted. Generally, the method 600 begins with a start operation 604 and terminates with an end operation 640. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 600 shall be explained with reference to the systems, components, modules, software, structures, etc. described in conjunction with FIGS. 1-5.

The method begins at step 604 and continues when a contact center customer 308 initiates a call from a customer communication device 108 (step 608). When the call reaches a prediction module 128, the prediction module 128 may begin an analysis. The analysis may include consideration of past agent performance (step 612) for several qualified agents. For example, agents Walter, Maria, and Andres 304 may have successfully completed a total of 50 work items from customers that have an attribute of speaking French. Each agent's ability to handle calls that require a French-speaking agent 304 may be one element that the prediction module 128 considers as part of an agent's performance prediction. Another aspect that may be part of the analysis may include consideration of contact attributes (step 616). A caller Sally 308 may be a female who speaks French and needs help with a smartphone. Additional customer attributes attributable to Sally 308 may be considered by the prediction module 128 (step 620), including but not limited to attributes like age, gender, buying potential, etc. Additional caller attributes might include smartphone carrier, country, and region. The prediction module 128 then may consider attributes of the agents Walter, Maria, and Andres 304, including each agent's ability to speak French, knowledge of the smartphone product, and ability to work support work items. Walter's attributes may be considered in step 620. Maria's attributes may be considered in step 624. Andres' attributes may be considered in step 628. The considerations of the agents (steps 620, 624, 628) may be done simultaneously or sequentially. Past performance may also be considered by the prediction module 128 for the three agents, Walter, Maria, and Andres 304, either simultaneously or sequentially (steps 632, 636, 640).

In the full analysis performed by the prediction module 128, past agent performance, contact attributes, customer attributes, and agent attributes may be aggregated, rated, and calculations may take place to provide an outcome value (step 644). The prediction module 128 may provide a performance prediction in step 648 to a work assignment engine 120 for work item assignment to an agent 304.

In addition to attributes, secondary considerations may optionally be considered by the prediction module 128 and the work assignment engine 120 (step 652). Examples of secondary considerations can include estimated wait time (EWT), idle time, average talk time, etc. which may be used to augment data, which may assist the determination of outcome values and routing decisions for the best match. Once the outcome values and performance predictions have been calculated and the secondary considerations factored in, the data is provided to the work assignment engine 120 (step 648). The work assignment engine 120 may use the data provided (in steps 644, 648, 652) to match the work item from Sally to the best agent, Walter 304. The work assignment engine 120 may route the work item to Walter 304 (step 656). Walter helps Sally complete the transaction, and the method ends (step 660).

The method could alternately be inverted such that a prediction of an agent's performance on multiple customers' work items could be done to select the best work item for assignment to a particular agent.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method of operating a contact center, comprising:
   receiving, at a processor of a work assignment engine a contact center and via a communication network, a work item from a first customer communication device associated with a first customer;

executing, with the processor, a prediction module, the executing comprising:
automatically predicting, with the processor, a first agent's skill, wherein the first agent's skill is predicted with a prediction model comprising a category model capable of predicting performance based solely on one or more attributes of the work item;
determining, with the processor, an uncertainty for the prediction of the first agent's skill;
automatically predicting, with the processor, a second agent's skill, wherein the second agent's skill is predicted with the prediction model;
automatically comparing, with the processor, the prediction for the first agent with the prediction for the second agent;

based on the comparison of predictions and the determined uncertainty, identifying with the processor, one of the first agent and second agent as a preferred agent for handling the work item;

automatically assigning, with the processor, the work item to an agent communication device associated with the preferred agent; and routing the work item from the work assignment to the agent communication device by establishing a connection between the first customer communication device and agent communication device, the connection enabling communication between the first customer communication device and agent communication device, wherein the determined uncertainty results in the one of the first agent and the second agent being identified as the preferred agent.

2. The method of claim 1, wherein the prediction model used to predict the first and second agent's skill is specific to a service category to which the work item is assigned.

3. The method of claim 2, wherein the service category is one of sales, support, or billing.

4. The method of claim 1, wherein the prediction of the first agent's skill is based on the first agent's past performance history on past work items that have one or more attributes in common with the work item.

5. The method of claim 1, further comprising:
using the prediction of the first agent's skill to calculate, with the processor, at least one of a first predicted cost and first predicted revenue that the first agent will generate while processing the work item;
using the prediction of the second agent's skill to calculate, with the processor, at least one of a second predicted cost and a second predicted revenue that the second agent will generate while processing the work item; and
comparing, with the processor, the at least one of a first predicted cost and first predicted revenue with the at least one of a second predicted cost and second predicted revenue.

6. The method of claim 1, wherein the determining, with the processor, an uncertainty for the prediction of the first agent's skill comprises assessing a penalty against the prediction of the first agent's skill, and further wherein the penalty is based on an experience level of the first agent.

7. A method of operating a contact center, comprising:
receiving, at a processor of a work assignment engine in a contact center and via a communication network, a plurality of work items from one or more customer communication devices;

determining, with the processor, an attribute combination for each of the plurality of work items, wherein the attribute combination for each of the plurality of work items comprises one or more attributes associated with contact processing requirements of each of the plurality of work items;

executing, with the processor, a prediction module, the executing comprising:
predicting, with the processor, an agent's skill at processing a first work item in the plurality of work items, wherein the agent's skill at processing the first work item is predicted with a prediction model specifically created based on one or more attributes of the agent and one or more attributes of the attribute combination of the first work item;
predicting, with the processor, the agent's skill at processing a second work item in the plurality of work items, wherein the agent's skill at processing the second work item is predicted with a prediction model specifically created based on one or more attributes of the agent and one or more attributes of the attribute combination of the second work item;
determining, with the processor, an uncertainty for the prediction of the agent's skill at processing one or more of the plurality of work items;
comparing, with the processor, the prediction for the first work item with the prediction for the second work item;

based on the comparison of the predictions and the determined uncertainty, identifying, with the processor, one of the first and second work items as a preferred work item for the agent to handle;

assigning, with the processor, the preferred work item to an agent communication device of the agent; and routing the preferred work item from the work assignment engine to the agent communication device by establishing a connection between the agent communication device and a preferred customer communication device corresponding to the preferred work item, the connection enabling communication between the preferred customer communication device and the agent communication device, wherein the determined uncertainty results in the one of the first and second work items being identified as the preferred work item.

8. The method of claim 7, wherein the preferred work item is an optimal work item for the agent.

9. The method of claim 7, wherein the prediction model used to predict the agent's skill at processing the first work item and the second work item is specific to past performance history on past work items that have one or more attributes in common with the first work item and the second work item, respectively.

10. The method of claim 7, further comprising:
using, with the processor, the prediction of the agent's skill at processing the first work item to calculate at least one of a first predicted cost and first predicted revenue that the agent will generate while processing the first work item;
using, with the processor, the prediction of the agent's skill at processing the second work item to calculate at least one of a second predicted cost and a second predicted revenue that the agent will generate while processing the second work item; and comparing, with the processor, the at least one of a first predicted cost and first predicted revenue with the at least one of a second predicted cost and second predicted revenue.

11. The method of claim 7, wherein the determining, with the processor, an uncertainty for the prediction of the agent's skill at processing one or more of the plurality of work items comprises assessing a penalty against the prediction, and further wherein the penalty is calculated based on a standard deviation associated with the prediction.

12. The method of claim 7, wherein the agent belongs to a service category comprising one of sales, support, or billing.

13. A server used in a contact center, the server comprising:
   a work assignment engine comprising a processor; and
   computer memory coupled with the processor, the computer memory comprising instructions that are executed by the processor, the instructions, when executed by the processor, enabling the processor to:
      receive a work item via a communication network from a first customer communication device associated with a first customer in a contact center;
      execute a prediction module, the executing comprising:
         automatically predicting a first agent's skill, wherein the first agent's skill is predicted with a prediction model comprising a category model capable of predicting performance based solely on one or more attributes of the work item;
         determining an uncertainty for the prediction of the first agent's skill;
         automatically predicting a second agent's skill, wherein the second agent's skill is predicted with the prediction model;
         automatically comparing the prediction for the first agent with the prediction for the second agent;
         based on the comparison of predictions and the determined uncertainty, identify one of the first agent and the second agent as a preferred agent for handing the work item;
         automatically assign the work item to an agent communication device associated with the preferred agent; and
         route the work item from the work assignment engine to the agent communication device by establishing a connection between the first customer communication device and the agent communication device, the connection enabling communication between the first customer communication device and the agent communication device,
      wherein the determined uncertainty results in the one of the first agent and the second agent being identified as the preferred agent.

14. The server of claim 13, wherein the instructions further enable the processor to:
   use the prediction of the first agent's skill to calculate at least one of a first predicted cost and first predicted revenue that the first agent will generate while processing the work item;
   use the prediction of the second agent's skill to calculate at least one of a second predicted cost and a second predicted revenue that the second agent will generate while processing the work item; and
   compare the at least one of a first predicted cost and first predicted revenue with the at least one of a second predicted cost and second predicted revenue.

15. The server of claim 13, wherein the prediction model used to predict the first and second agent's skill is specific to a service category to which the work item is assigned, wherein the service category is one of sales, support, or billing, and wherein the prediction of the first agent's skill is based on the first agent's past performance history on past work items that have one or more attributes in common with the work item.

16. A server used in a contact center, the server comprising:
   a work assignment engine comprising a processor; and
   computer memory coupled with the processor, the computer memory comprising instructions that are executed by the processor, the instructions, when executed by the processor, enabling the processor to:
      receive a plurality of work items via a communication network from one or more customer communication devices associated with one or more customers in a contact center;
      determine an attribute combination for each of the plurality of work items, wherein the attribute combination for each of the plurality of work items comprises one or more attributes associated with contact processing requirements of each of the plurality of work items;
      execute, with the processor, a prediction module, the executing comprising;
         predicting a contact center agent's skill at processing a first work item in the plurality of work items, wherein the contact center agent's skill at processing the first work item is predicted with a prediction model specifically created based on one or more attributes of the contact center agent and one or more attributes of the attribute combination of the first work item;
         predicting the contact center agent's skill at processing a second work item in the plurality of work items, wherein the contact center agent's skill at processing the second work item is predicted with a prediction model specifically created based on one or more attributes of the contact center agent and one or more attributes of the attribute combination of the second work item;
         determining an uncertainty associated with the prediction of the contact center agent's skill at processing each of the first and second work items;
         comparing the prediction for the first work item with the prediction for the second work item;
         determining an uncertainty associated with the prediction of the contact center agent's skill at processing each of the first and second work items;
         comparing the prediction for the first work item with the prediction for the second work item;
      based on the comparison of the predictions and the determined uncertainty, identify one of the first and second work items as a preferred work item for the contact center agent to handle;
      assign the preferred work item to an agent communication device associated with the contact center agent; and
      route preferred work item to the agent communication device by establishing a connection between the agent communication device and a preferred customer communication device corresponding to the preferred work item, the connection enabling communication between the preferred customer communication device and the agent communication device, wherein the determined uncertainty result in the one of the first and second work items being identified as the preferred work item.

17. The server of claim 16, wherein the preferred work item is an optimal work item for the contact center agent.

18. The server of claim 16, wherein the attributes of the contact center agent comprise one or more of language proficiency, product knowledge, or transaction type.

19. The server of claim 16, wherein the comparison of the prediction for the first work item with the prediction for the second work item includes use of the determined uncertainty for each of the prediction for the first work item and the prediction for the second work item.

20. The server of claim 16, wherein the contact center agent belongs to a service category comprising one of sales, support, or billing.

* * * * *